US010052693B2

(12) United States Patent
Kurokawa

(10) Patent No.: US 10,052,693 B2
(45) Date of Patent: Aug. 21, 2018

(54) PLATE MEMBER OF CUTTING TOOL, TOOL BLOCK, CLAMP MEMBER, AND CUTTING TOOL

(71) Applicant: TUNGALOY CORPORATION, Iwaki-shi (JP)

(72) Inventor: Masahiro Kurokawa, Iwaki (JP)

(73) Assignee: TUNGALOY CORPORATION, Iwaki-Shi, Fukushima (JP)

( * ) Notice: Subject to any disclaimer, the term of this patent is extended or adjusted under 35 U.S.C. 154(b) by 252 days.

(21) Appl. No.: 14/915,859

(22) PCT Filed: Jan. 13, 2015

(86) PCT No.: PCT/JP2015/050698
§ 371 (c)(1),
(2) Date: Mar. 1, 2016

(87) PCT Pub. No.: WO2015/108042
PCT Pub. Date: Jul. 23, 2015

(65) Prior Publication Data
US 2016/0193661 A1 Jul. 7, 2016

(30) Foreign Application Priority Data
Jan. 14, 2014 (JP) ................................. 2014-003951

(51) Int. Cl.
*B23B 27/08* (2006.01)
*B23B 27/04* (2006.01)
(Continued)

(52) U.S. Cl.
CPC ............ *B23B 27/086* (2013.01); *B23B 27/04* (2013.01); *B23B 27/08* (2013.01); *B23B 29/043* (2013.01);
(Continued)

(58) Field of Classification Search
CPC ....... B32B 27/086; B32B 27/04; B32B 27/08; B32B 29/043; B32B 2220/126; B32B 2220/12
See application file for complete search history.

(56) References Cited

U.S. PATENT DOCUMENTS

| 5,079,979 A | 1/1992 | Pano |
| 6,113,319 A * | 9/2000 | Hansson ............... B23B 29/043 407/109 |
| 2010/0254773 A1 | 10/2010 | Hecht |

FOREIGN PATENT DOCUMENTS

| DE | 382868 C * | 10/1923 | ............. B23B 27/08 |
| FR | 2300645 A1 * | 9/1976 | ........... B23B 29/043 |

(Continued)

OTHER PUBLICATIONS

English translation of FR 2300645, dated Sep. 1976.*
(Continued)

*Primary Examiner* — Alan Snyder
(74) *Attorney, Agent, or Firm* — Studebaker & Brackett PC

(57) ABSTRACT

A plate member of a cutting tool has two side surfaces being substantially rectangular in shape, a top surface and a bottom surface extending in a direction along a long side of the rectangle, and two end surfaces in a short-side direction. A cutting edge is located on the side of one of the end surfaces. One of the side surfaces is a curved surface bulging outward. The bottom surface has an inclined portion which is inclined with respect to the top surface. The plate member is held by a tool block having a bottom restraining surface which comes into contact with the bottom surface, and is fastened to the tool block by using a clamp member having a top restraining surface which comes into contact with the top surface of the plate member.

12 Claims, 19 Drawing Sheets

(51) Int. Cl.
   *B23B 29/06* (2006.01)
   *B23B 29/04* (2006.01)
(52) U.S. Cl.
   CPC .......... *B23B 29/06* (2013.01); *B23B 2220/12* (2013.01); *B23B 2220/126* (2013.01)

(56) References Cited

FOREIGN PATENT DOCUMENTS

| | | | |
|---|---|---|---|
| FR | 2300645 A1 | 9/1976 | |
| GB | 138040 A  * | 1/1920 | ............. B23B 27/08 |
| GB | 138040 | 8/1920 | |
| JP | 52-9186 | 7/1975 | |
| JP | 63-140303 | 3/1987 | |
| JP | 1-246004 | 3/1988 | |

OTHER PUBLICATIONS

Office Action dated May 23, 2017, issued in counterpart Japanese application (No. 2016-147422) (with translation).
International Search Report dated Apr. 7, 2015 issued in counterpart International (PCT) Application (No. PCT/JP2015/050698).

* cited by examiner

PLATE MEMBER OF CUTTING TOOL, TOOL BLOCK, CLAMP MEMBER, AND CUTTING TOOL

RELATED APPLICATIONS

This is a 371 US National Phase of International Patent Application No. PCT/JP2015/050698 filed Jan. 13, 2015, and published as WO 2015/108042 on Jul. 23, 2015, which claims priority to JP 2014-003951, filed Jan. 14, 2014. The contents of the aforementioned applications are incorporated by reference in their entirety.

TECHNICAL FIELD

The present invention relates to a plate member of a cutting tool. The present invention also relates to a tool block and a clamp member for fastening the plate member, and a cutting tool having the plate member.

BACKGROUND ART

A conventional cutting tool is disclosed in Patent Literature 1. More specifically, Patent Literature 1 discloses a cutting tool for face grooving, which is used for grooving an end face of a workpiece, and a configuration using a member called an adjustment blade to adapt to various widths of grooves to be machined. The adjustment blade is a plate member which partly curves. To the curved plate portion, a cutting insert in the form of a grooving insert is removably mounted. The adjustment blade is fastened to the member in a shank side with two bolts.

CITATION LIST

Patent Literature

PTL 1: Japanese Utility Model Application Laid-Open No. Sho 63-140303(1988)

SUMMARY OF INVENTION

Technical Problem

However, the cutting tool of Patent Literature 1 does not have an adjustment mechanism for a projection length of the curved plate portion. That is, the projection length of the curved plate portion is fixed.

In general, a cutting tool provided with a curved plate member having a large projection length has an advantage that less interference with a workpiece allows grooving to a greater depth and that the cutting tool is easy to handle. In the cutting tool having a large projection length, however, chatter vibration easily occurs depending on machining conditions, which may degrade the quality of a finished surface. Accordingly, in response to a need for grooving to a greater depth and improving the quality of a finished surface, which are in a trade-off relationship, it is desired that the projection length of a cutting edge of the cutting tool be appropriately adjustable depending on the shape of a workpiece, cutting conditions, and the like and that the cutting tool be held in a stable manner.

An object of the present invention is to adjust a projection length of a cutting edge, by using a plate member for a cutting tool, while holding the plate member in a stable manner.

Solution to Problem

A plate member (2) of a cutting tool (1) of the present invention includes: first and second side surfaces (7, 8) being substantially rectangular in shape, each having long and short sides, a top surface (3) and a bottom surface (4) extending in a direction along the long side, and two end surfaces (5, 6) along a direction of the short side, wherein a cutting edge is located on the side of at least one end surface (5) of the two end surfaces (5, 6), the first side surface (7) is a curved surface bulging outward between the top surface (3) and the bottom surface (4), and the bottom surface (4) has an inclined portion being inclined with respect to the top surface (3).

A tool block of the present invention is a tool block (30) for holding the plate member (2) of the cutting tool (1) of the present invention, and includes a bottom restraining surface (32) which comes into contact with the bottom surface (4) of the plate member (2).

A clamp member of the present invention is a clamp member (40) for fastening the plate member (2) of the cutting tool (1) of the present invention to the tool block (30) of the present invention, and includes a top restraining surface (41) which comes into contact with a top surface (3) of the plate member (2).

A cutting tool of the present invention is a cutting tool (1) including the plate member (2) of the present invention.

Advantageous Effects of Invention

According to the present invention, it is possible to fasten the plate member (2) by bringing the bottom surface (4) of the plate member (2) of the cutting tool (1) into contact with the bottom restraining surface (32), bringing the first side surface (7) formed as a curved surface that outwardly bulges into contact with the side restraining surface (33), and applying a clamping force to the top surface (3) being inclined relative to the bottom surface (4) from the top restraining surface (41). This allows adjustment of a projection length of a cutting edge while holding the plate member in a stable manner. Accordingly, while suppressing chatter vibration and improving the quality of a finished surface, it becomes possible to avoid interference with a workpiece and appropriately adjust the projection length of the cutting edge of the cutting tool depending on the shape of the workpiece and cutting conditions.

Further, according to the tool block of the present invention providing the bottom restraining surface (32) and the side restraining surface (33) and the clamp member of the present invention applying a clamping force via the top restraining surface (41), it is possible to provide a cutting tool capable of achieving a high tool rigidity and greatly suppressing occurrence of chatter vibration or the like by operating with the plate member of the present invention to timely adjust the projection length.

DESCRIPTION OF EMBODIMENTS

Embodiments of a cutting tool to which the present invention is applied will be described with reference to the attached drawings.

First Embodiment

Figure 8:
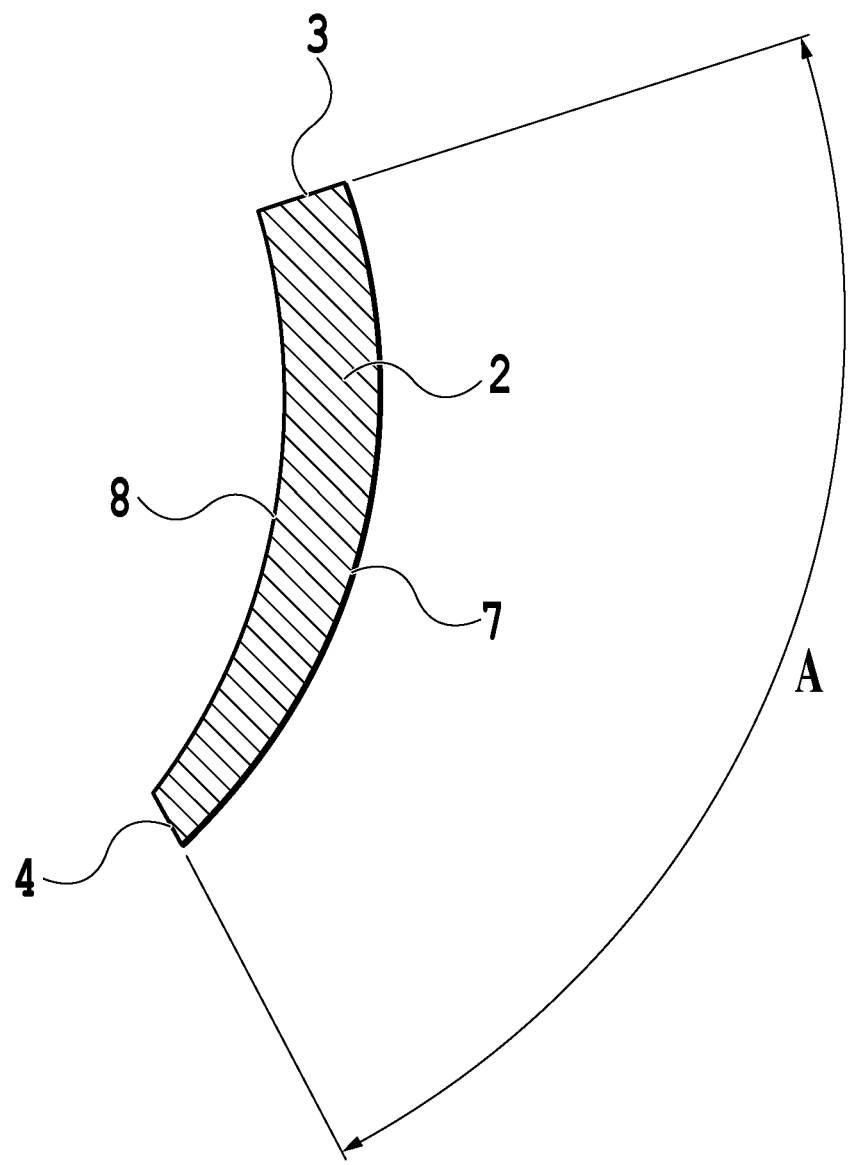
FIG. 8 is a cross-sectional view taken along line VIII-VIII of the plate member of FIG. 4.
Figure 9:
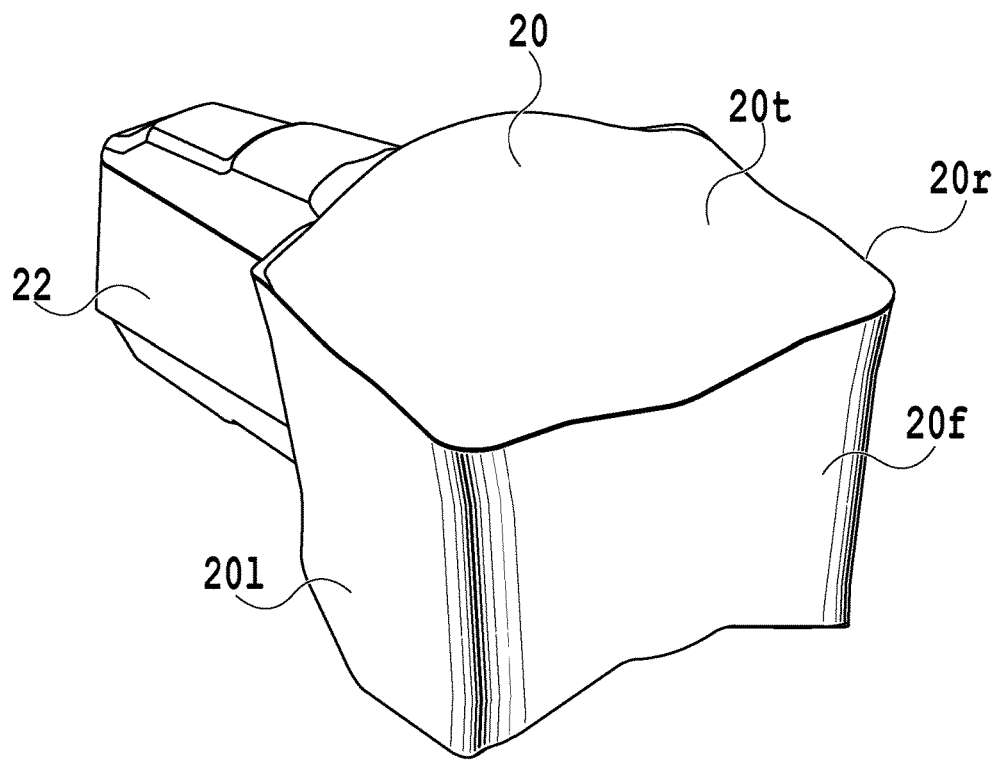
FIG. 9 is a perspective view of a cutting insert of the cutting tool of FIG. 1.
Figure 10:
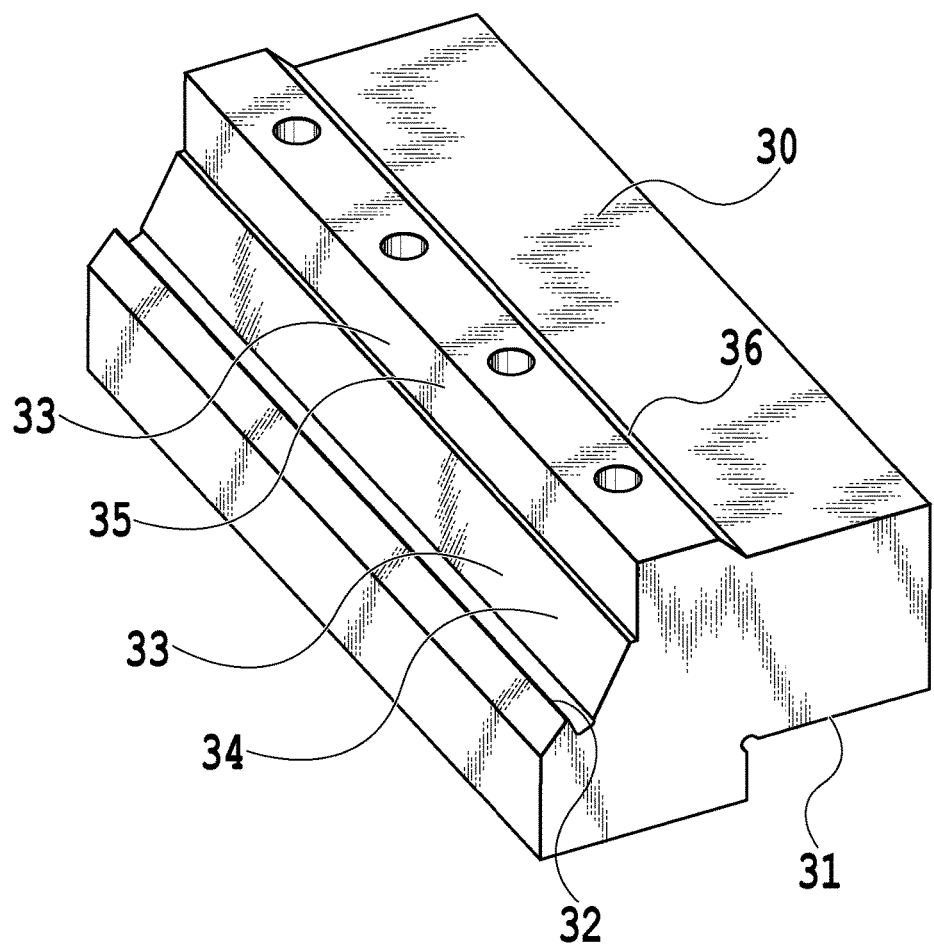
FIG. 10 is a perspective view of a tool block of the cutting tool of FIG. 1.
Figure 15:
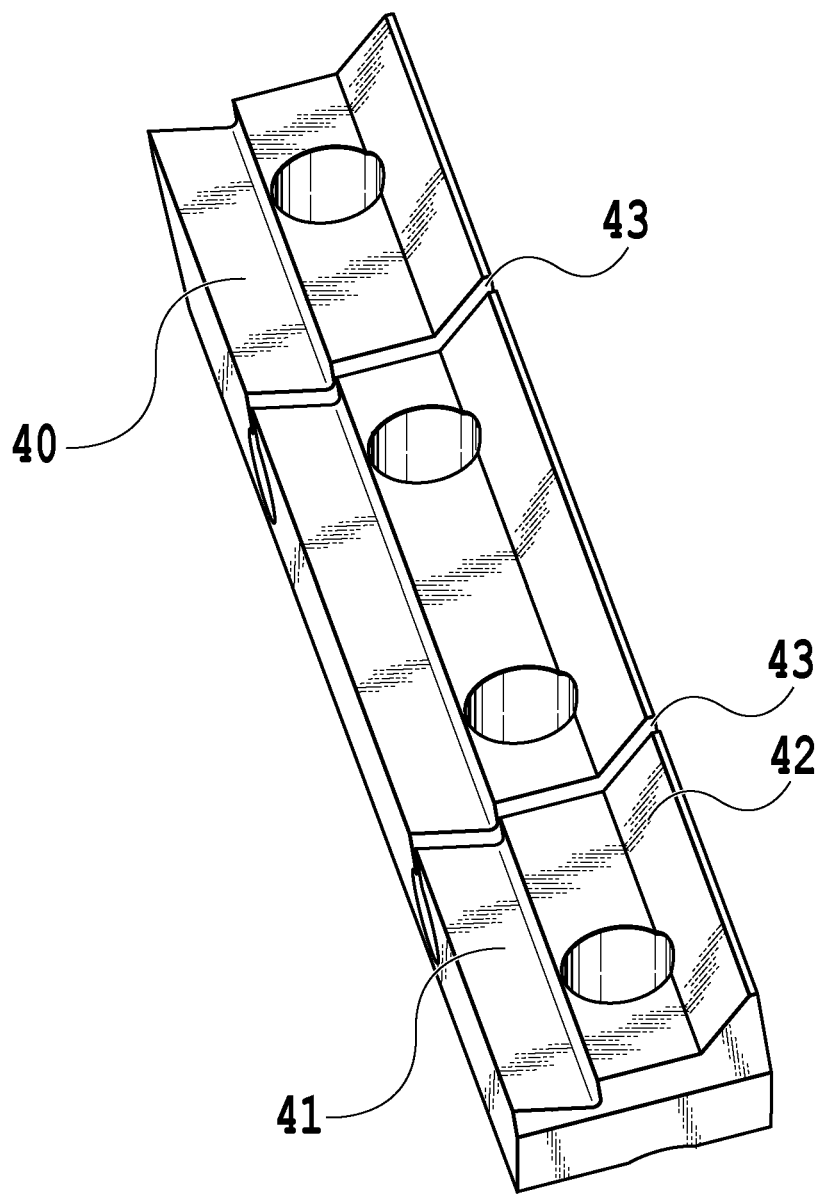
FIG. 15 is a perspective view of the clamp member of FIG. 14 as viewed from a different direction.
Figure 16:
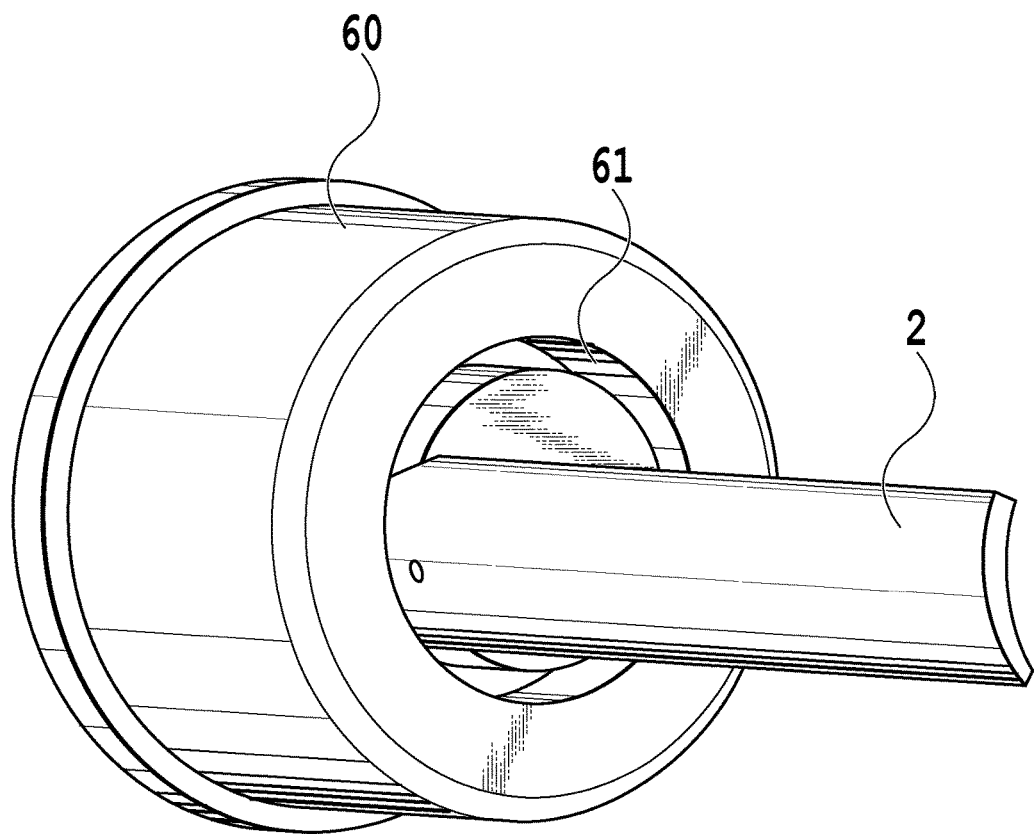
FIG. 16 is a perspective view illustrating face grooving by the plate member of the cutting tool of FIG. 1.
Figure 17:
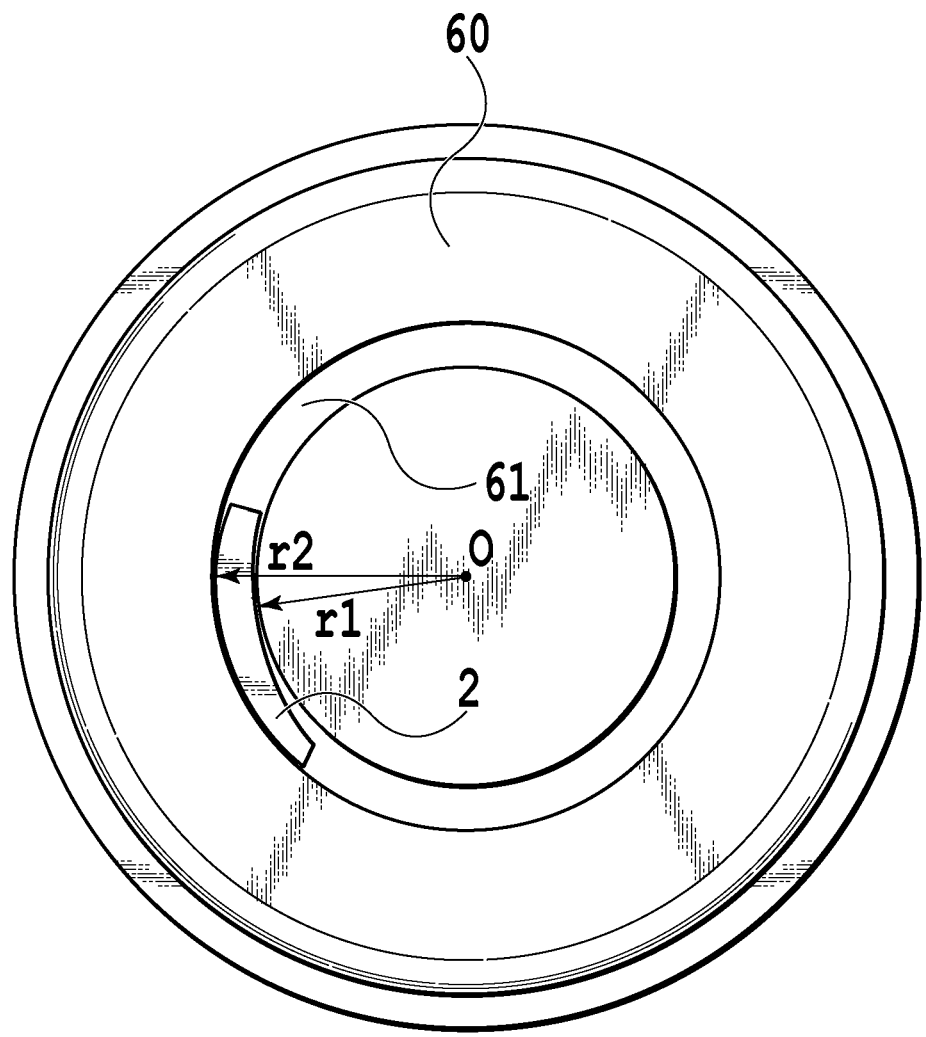
FIG. 17 is a back view illustrating face grooving of FIG. 16.

As shown in FIGS. 1 to 15, a cutting tool 1 of a first embodiment is a cutting tool for face grooving, which is used for grooving an end face of a workpiece. The face grooving means grooving as shown in conceptual views of FIGS. 16 and 17. If the cutting tool 1 of the present embodiment that is attached to a machine tool, such as a turning machine, is applied to an end face of a workpiece 60, an annular groove 61 is machined. It should be noted that for the sake of simplicity, FIGS. 16 and 17 show only a plate member 2 as the cutting tool 1. Practically, the plate member 2 is fastened to a tool block 30 by a clamp member 40 and a fastening member 50 to form the cutting tool 1. As shown in FIG. 9, the cutting tool 1 uses a cutting insert 20 having cutting edges formed on intersecting ridges between a top surface (rake surface) 20t and each of a front surface 20f and right and left side surfaces 20l, 20r. However, the shape of the cutting edge and the shape of the cutting insert 20 are not limited to those of the present embodiment. The cutting insert 20 in various known shapes may be applied.

The cutting tool 1 of the present embodiment is particularly suitable for face grooving. As described before, since the face grooving machines the groove 61 in an annular shape, a portion around the cutting edge of the applied cutting tool 1 is preferably a curved plate to follow the annular groove 61 to be machined. Since the portion around the cutting edge of the cutting tool 1 is the curved plate, as shown in the conceptual view of FIG. 17, a plate portion can be accommodated in the annular groove 61, so that rigidity for supporting the cutting edge can be maintained.

Figure 4:
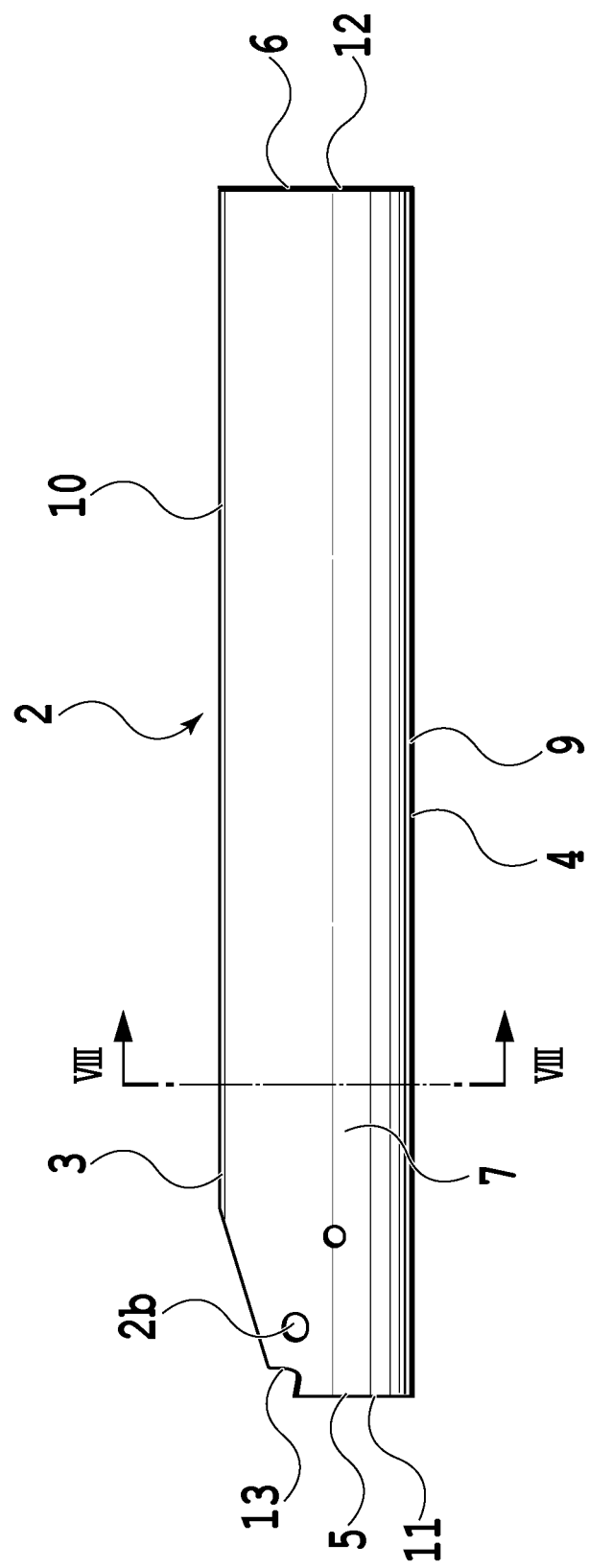
FIG. 4 is a right side view of the plate member of FIG. 3.

The cutting insert 20 is removably mounted on an insert seat 13 of the plate member 2. In the case of the cutting tool 1 for face grooving, the cutting insert 20 for grooving in various known shapes can be applied. In the present embodiment, the cutting insert 20 is fixed by elasticity of the insert seat 13 and the portion around the insert seat 13. That is, when the cutting insert 20 is mounted, the cutting insert 20 is fixed in a manner that a shank 22 in a proximal end of the cutting insert 20 is forced into the insert seat 13 having an internal shape to fit the shank 22, thereby elastically deforming a portion around the insert seat 13. When the cutting insert 20 is removed, the portion around the insert seat 13 is released from the elastic deformation. A hole 2b provided on the plate member 2, as shown in FIG. 4 and the like, is a hole into which a member such as a wrench for removing the cutting insert 20 is inserted. Using the cutting tool 1 allows replacement of the cutting insert 20, if worn, with another cutting insert 20. Accordingly, this cutting tool 1 is economical as it can be used repeatedly. The cutting insert 20 can be simply structured because it is fixed by elasticity of the insert seat 13 and the portion around the insert seat 13, without a portion protruding upward from the plate member 2. Accordingly, without interference with the workpiece 60, the cutting tool 1 is also effective in machining with high precision since it has a high chip discharging ability particularly in face grooving.

Fixing methods for mounting the cutting insert 20 on the plate member 2 are not limited to the present embodiment. Various known fixing methods for the cutting insert 20 are applicable. For example, a clamp member such as a presser piece or a screw may also be used for fixing. However, in consideration of grooving to a greater depth and a chip removal performance, it is strongly desired that a clamp member and a screw head be configured not to protrude from the plate member 2.

Further, the cutting tool is not limited to the one described in the present embodiment which uses the cutting insert 20. The cutting tool may have a plate member to which an insert having a cutting edge is brazed (not shown). The plate member may be made of hard material such as a cemented carbide and ceramic, and may be a plate member having a cutting edge integrally formed therewith (not shown).

It should be noted that in the present embodiment, the cutting insert 20 is used which has a cutting edge having a width of about 4 mm, formed on an intersecting ridge between the front surface 20f and the top surface 20t, that is, the cutting tool 1 for face grooving suitable for machining the groove 61 having a width of about 4 mm on the workpiece 60. However, the width of the cutting edge is not limited to the one described in the present embodiment. The width of the cutting edge may be appropriately selected according to the width of a groove of a workpiece and cutting conditions.

As described above, the plate member 2 is fastened to the tool block 30 by the clamp member 40 and the fastening member 50. The tool block 30 has an attachment reference surface 31. The portion of the attachment reference surface 31 is mounted on a machine tool such as a turning machine. Details of the configuration of the tool block 30 will be described later. The plate member 2 has a top surface 3, a bottom surface 4, two end surfaces 5, 6, a first side surface 7, and a second side surface 8. The two end surfaces 5, 6 are called a front end surface 5 and a rear end surface 6 for convenience. The insert seat 13 may be formed on the top surface 3 on the side of the front end surface 5. For the sake of simplicity, terms representing orientations within a space, such as the top surface 3 and the front end surface 5, are used. The terms are used for convenience, and are not intended to define absolute orientations and positional relations within a space. Unless otherwise specifically indicated, the same applies to other terms representing orientations and positional relations within a space.

Figure 1:
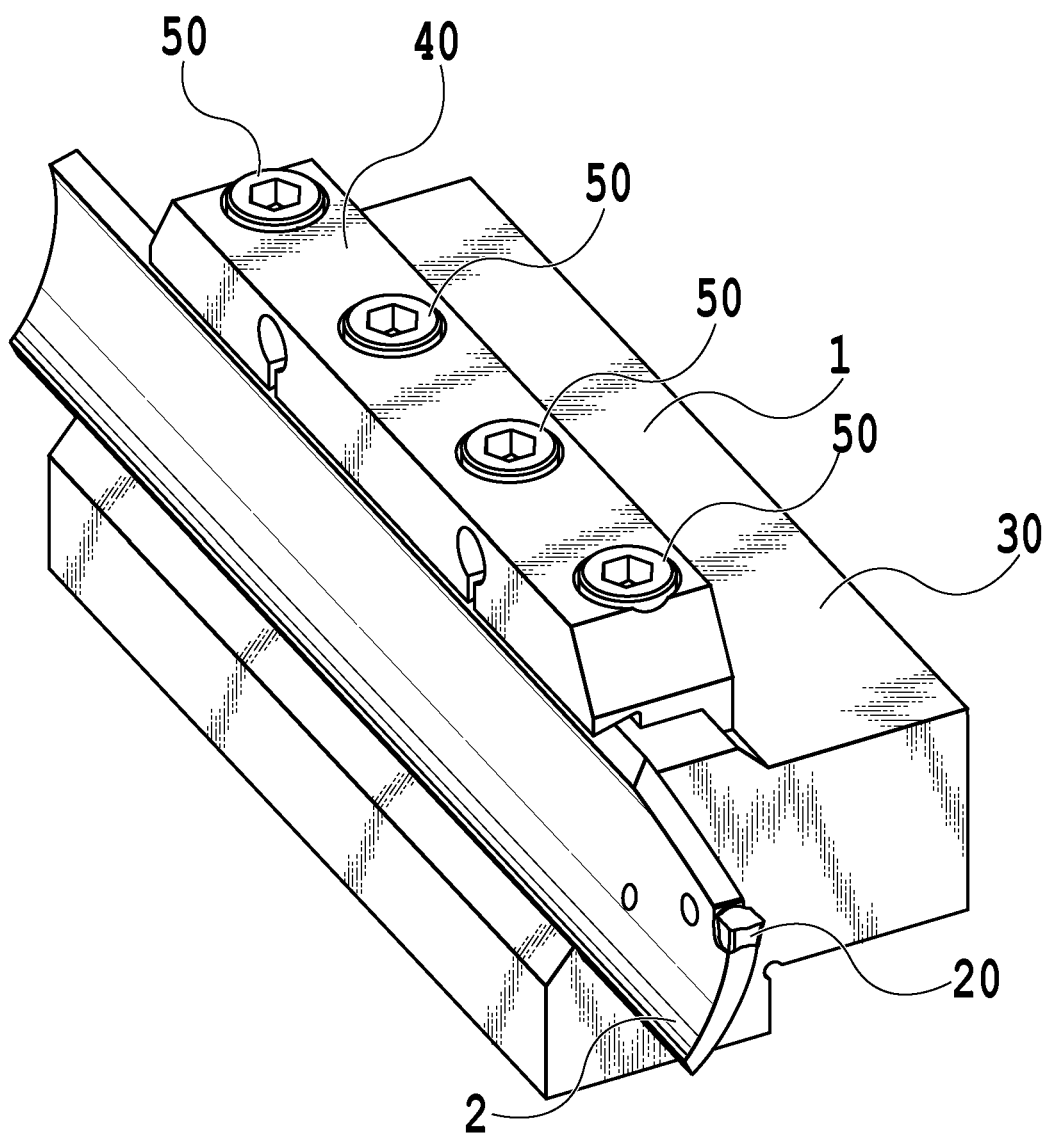
FIG. 1 is a perspective view of a cutting tool according to a first embodiment.
Figure 2:
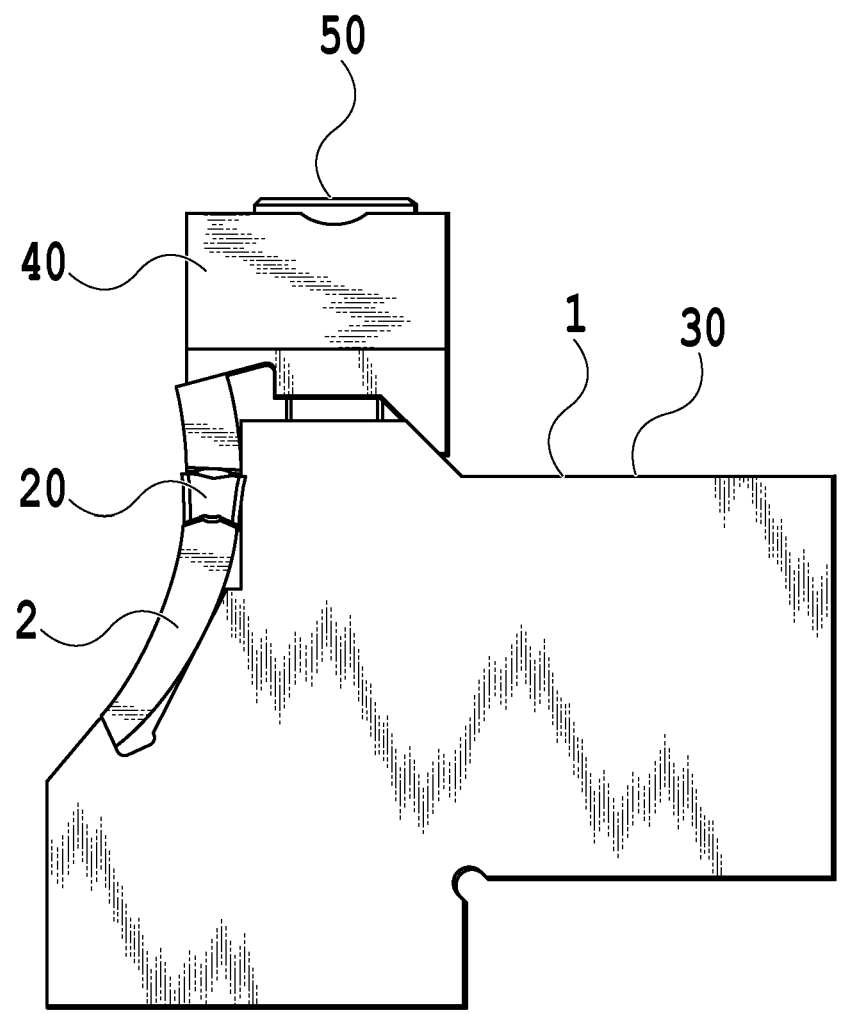
FIG. 2 is a front view of the cutting tool of FIG. 1.
Figure 3:
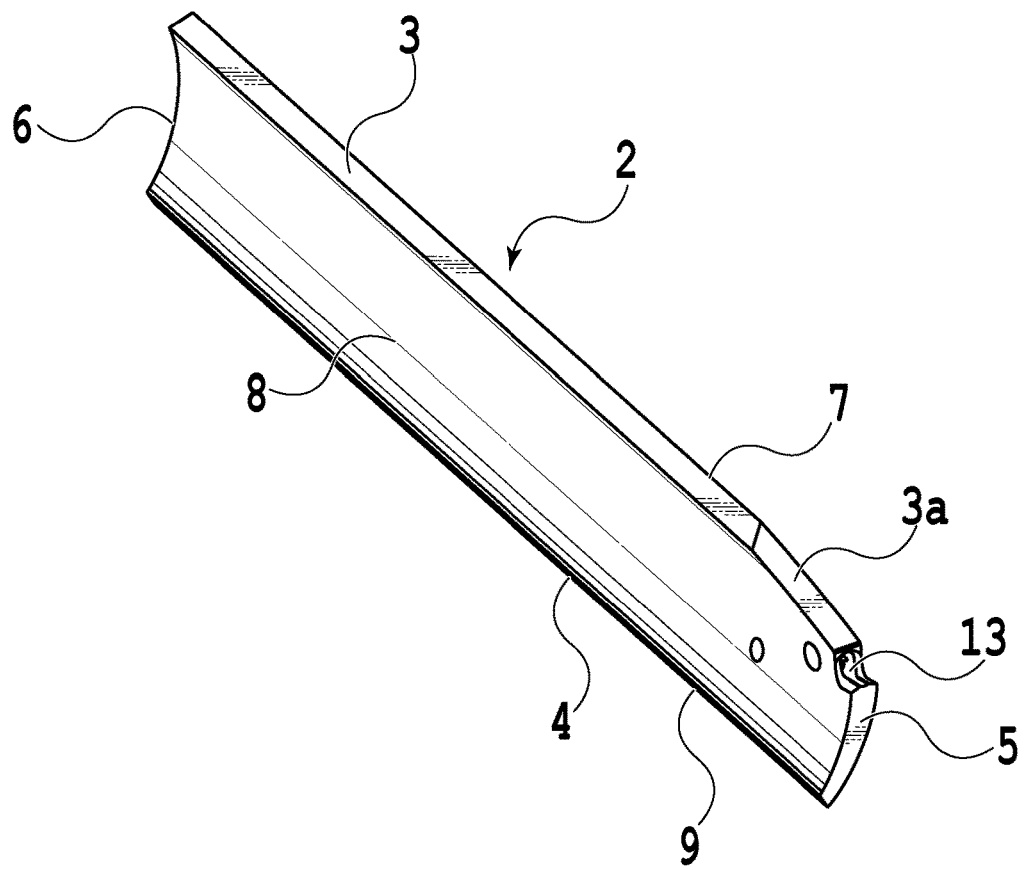
FIG. 3 is a perspective view of a plate member of the cutting tool of FIG. 1.
Figure 5:
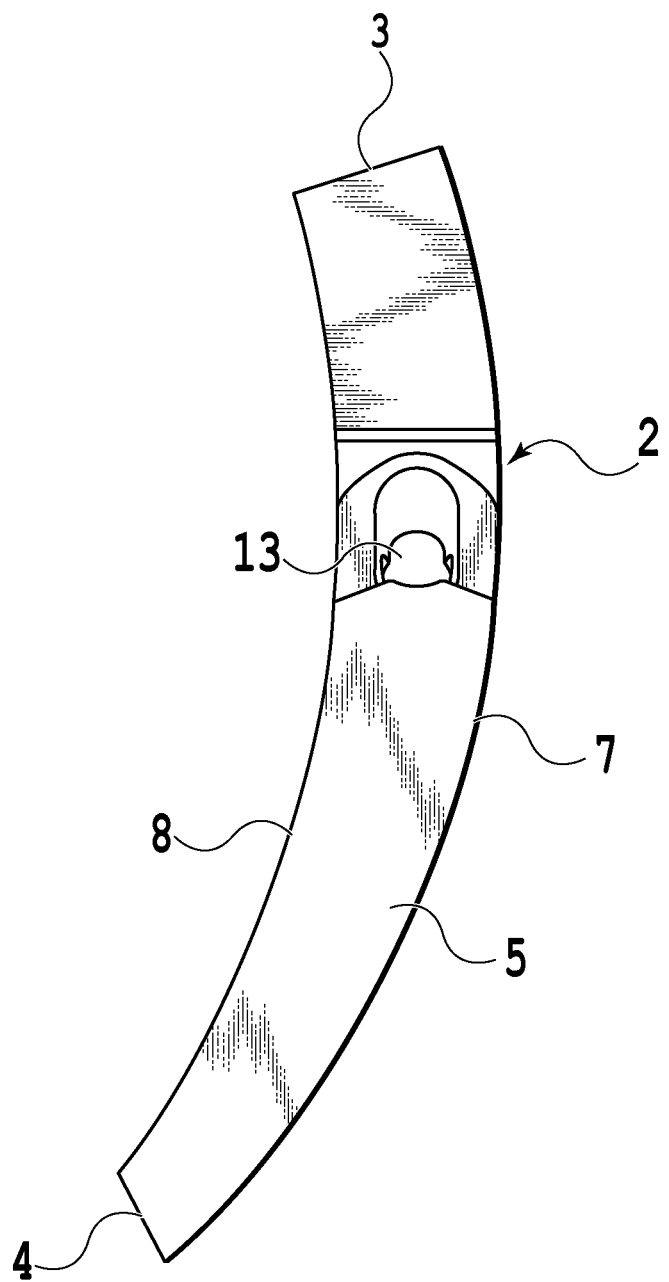
FIG. 5 is a front view of the plate member of FIG. 3.
Figure 6:
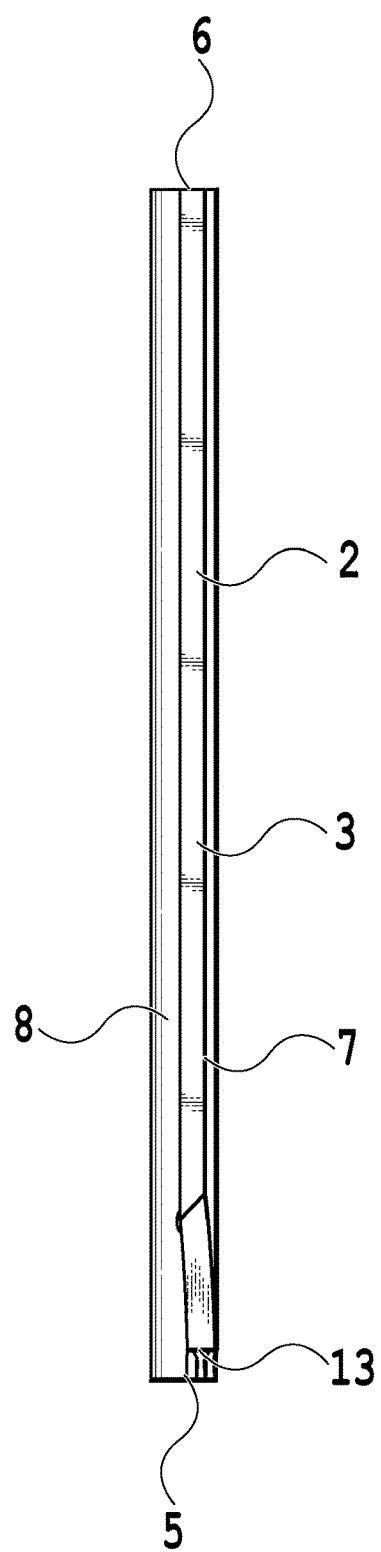
FIG. 6 is a plan view of the plate member of FIG. 3.

As shown in FIGS. 3, 5, etc., the first side surface 7 of the plate member 2 is a curved surface bulging outward. The second side surface 8 in the opposite side is a curved surface being bowed inward. The shapes of the first and second side surfaces 7, 8 are limited not to interfere with the machining shape of a workpiece. More specifically, as shown in the conceptual view of FIG. 17, in the case of face grooving, since a portion of the plate member 2 can enter the inside of the groove 61 that is machined into an annular shape, even if a cutting edge is put deep inside the groove to machine a deep groove, the cutting insert 20, or the cutting edge, can be held in a stable manner. In other words, the plate member 2 may be curved so as to enter without interference the inside of the groove 61 of the workpiece that is machined into an annular shape. That is, a radius of curvature of the second side surface 8 is equal to or greater than half a machining diameter (diameter) of a wall surface, near the center O, of the annular groove machined on the workpiece (i.e., a radius of curvature r1). A radius of curvature of the first side surface 7 is equal to or less than a radius of curvature r2 obtained by adding the width of the cutting edge to the half of this machining diameter (diameter). Setting the radii of curvature of the first and second side surfaces in the above manner can secure a clearance between the plate member 2 and a machined groove on both sides. That is, the plate member 2 has clearance angles on both side surfaces 7, 8 at least on secured portions of the cutting insert 20.

As shown in the right side view of FIG. 4, as viewed from a direction facing the first side surface 7, the profile of the plate member 2 is substantially a rectangle having two long sides 9, 10 and two short sides 11, 12. The two long sides 9, 10 are substantially parallel with each other. An intersecting ridge between the first side surface 7 and the bottom surface 4 is referred to as a first long side 9. An intersecting ridge between the first side surface 7 and the front end surface 5 is referred to as a first short side 11. As the plate member 2 substantially being a rectangle, the projection length of the cutting edge from the tool block 30 in a longitudinal direction can be adjusted. More specifically, to adjust the projection length in a direction parallel to an intersecting ridge 9 between the bottom surface 4 and the first side surface 7, a shape of a cross section perpendicular to the intersecting ridge is constant within a predetermined range. That is, the plate member 2 can be clamped in any position in the direction of the intersecting ridge because the cross-sectional shape is constant within the predetermined range.

Within a predetermined range needed for the adjustment of the projection length of the plate member 2, a contact position between the plate member 2, and the tool block 30 and the clamp member 40 can be shifted. This intersecting ridge is the first long side 9. The constant cross-sectional shape is shown in FIG. 8. FIG. 8 shows a cross section along line VIII-VIII of FIG. 4, but the cross-sectional shape is constant within the predetermined range.

Figure 7:
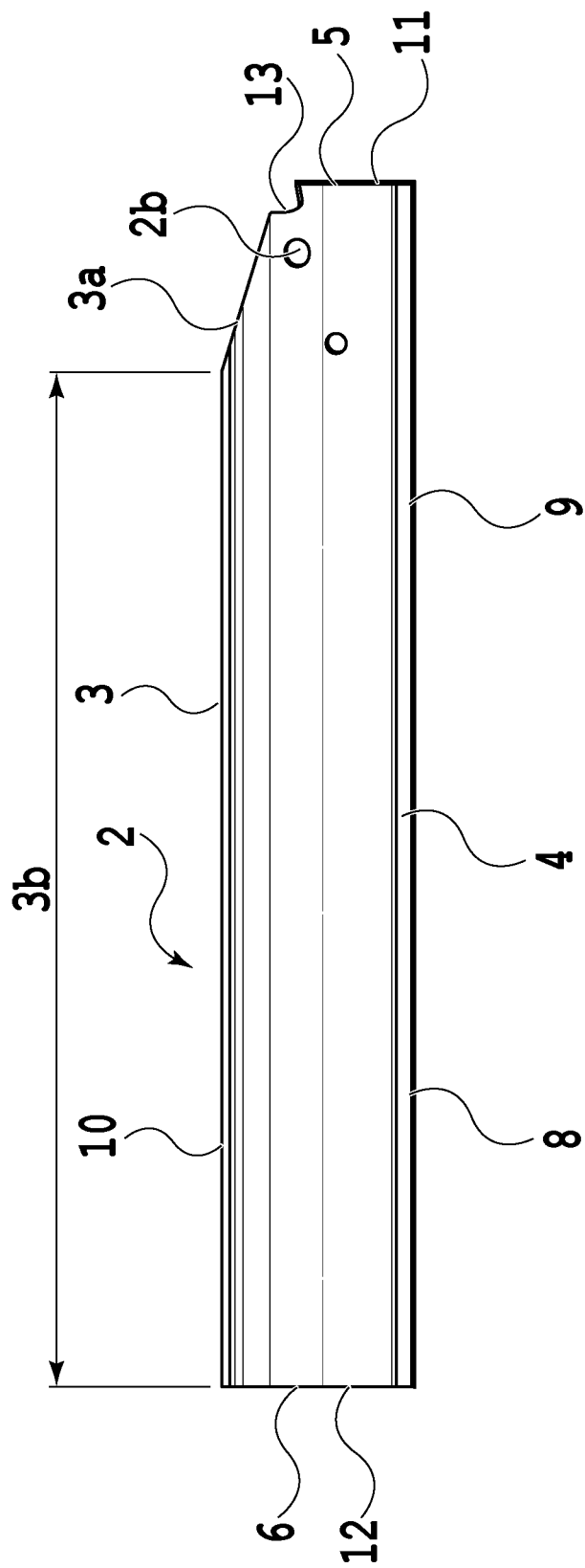
FIG. 7 is a left side view of the plate member of FIG. 3.

It should be noted that around the insert seat 13 of the plate member 2, an inclined surface 3a is formed which is a portion of the top surface 3. The inclined surface 3a is a surface serving as a chip pocket for discharging chips. In the cutting tool 1 of the present embodiment, however, the inclined surface 3a is not concave but flat. Therefore, the inclined surface 3a may be called a chip guiding surface instead of a chip pocket. The chip guiding surface is a surface serving to guide chips to be discharged from the groove machined on the workpiece. In the cutting tool 1 of the present embodiment, as shown in FIG. 7, the predetermined range 3b within which a cross-sectional shape is constant is an entire area of the portion other than the chip guiding surface, or the inclined surface. That is, the cross-sectional shape from the rear end surface 6 to the starting position of the chip guiding surface is constant. If the cross-sectional shape is formed as such, the plate member 2 is easily produced with high precision by grinding or the like. Accordingly, a clamping rigidity can also be increased. However, the range is not limited to this. The range within which a cross-sectional shape is constant only needs to be secured according to an adjustment amount of the projection length of the plate member 2. A portion not affecting the adjustment of the projection length may have any shape.

As shown in the cross-sectional view of FIG. 8 and the front view of FIG. 5, the bottom surface 4 of the plate member 2 is inclined with respect to the top surface 3. That is, a distance between the top surface 3 and the bottom surface 4 on the side of the first side surface 7 is greater than a distance between the top surface 3 and the bottom surface 4 on the side of the second side surface 8, which is opposite to the first side surface 7. In other words, in the cross-sectional shape shown in FIG. 8, a straight line extending approximate to the top surface 3 and a straight line extending approximate to the bottom surface 4 cross on the side of the second side surface 8. Both the top surface 3 and the bottom surface 4 are surfaces serving as contact surfaces when the plate member 2 is fastened to the tool block 30. In the cutting tool 1 of the present embodiment, the top surface 3 and the bottom surface 4 of the plate member 2 are flat, but not limited thereto. The top surface 3 and the bottom surface 4 may have any shapes as long as they can come into contact with the tool block 30 and the clamp member 40. The bottom surface 4 only needs to at least partly have an inclined portion with respect to the top surface 3. That is, the contact surface of the bottom surface 4 only needs to be the inclined portion at least partly formed on the bottom surface 4, which is inclined with respect to the contact surface of the top surface 3. If the bottom surface 4 is flat, the inclined portion of the bottom surface 4 indicates the entire bottom surface 4.

Regardless of whether the bottom surface 4 is inclined with respect to the top surface 3 or whether the bottom surface 4 has an inclined portion, a force pressing the plate member 2 toward the first side surface 7 is applied when the plate member 2 is fastened to the tool block 30. Therefore, the first side surface 7 of the plate member 2 can be used as a contact surface with the tool block 30. The plate member 2 is firmly fastened to the tool block 30 with at least three contact surfaces: the top surface 3, the inclined portion of the bottom surface 4, and the first side surface 7. As a result, the clamping rigidity increases and occurrence of chatter vibration can be suppressed. Also, the quality of a finished surface can be improved. An angle of inclination A of the inclined portion of the bottom surface 4 with respect to the top surface 3 is preferably in the range of 10° to 90°. The angle of inclination A is more preferably in the range of 60° to 90°. Such an angle of inclination A can increase stability of fastening the plate member 2 to the tool block 30. In the present embodiment, the angle of inclination A of the bottom surface 4 with respect to the top surface 3 is set to about 80°.

Figure 11:
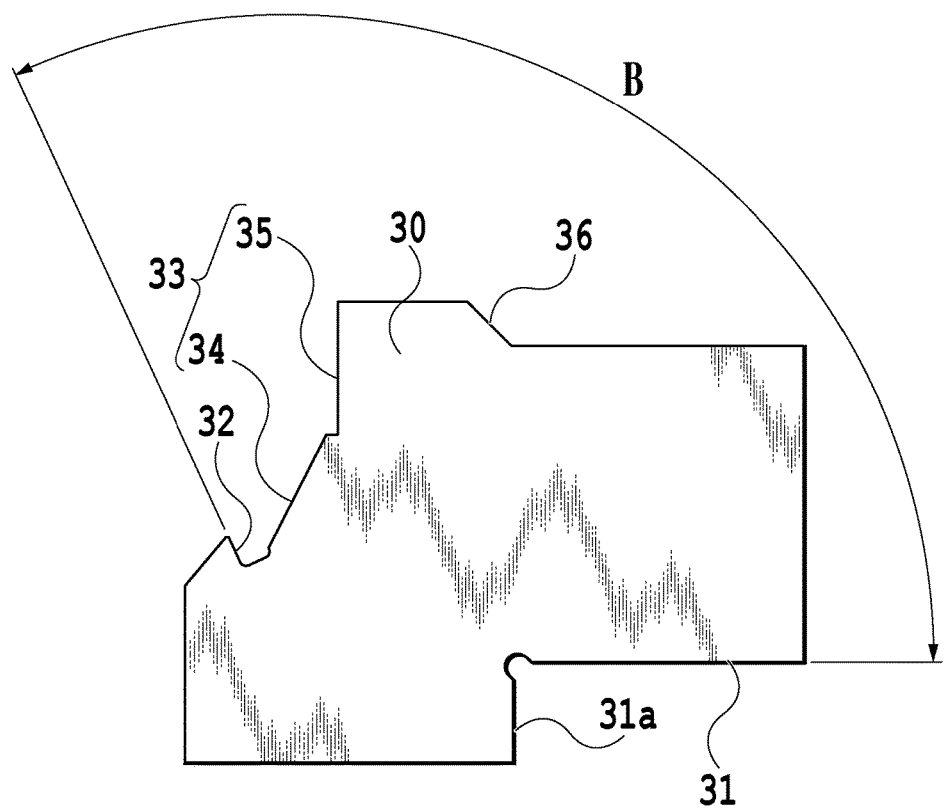
FIG. 11 is a front view of the tool block of FIG. 10.
Figure 12:
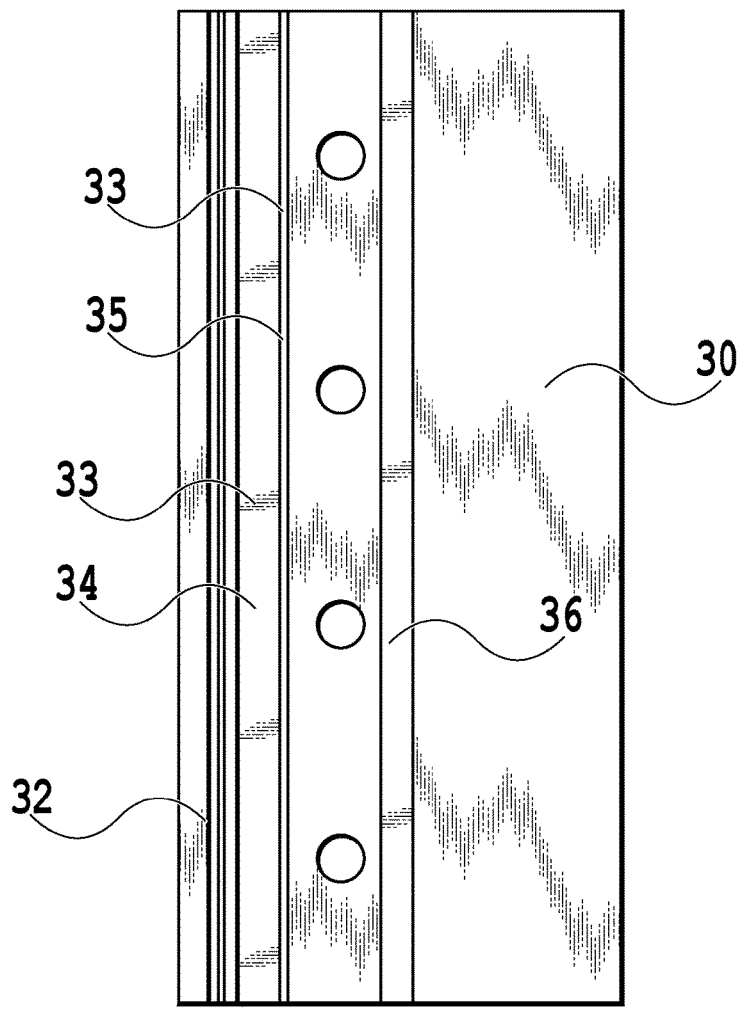
FIG. 12 is a plan view of the tool block of FIG. 10.
Figure 13:
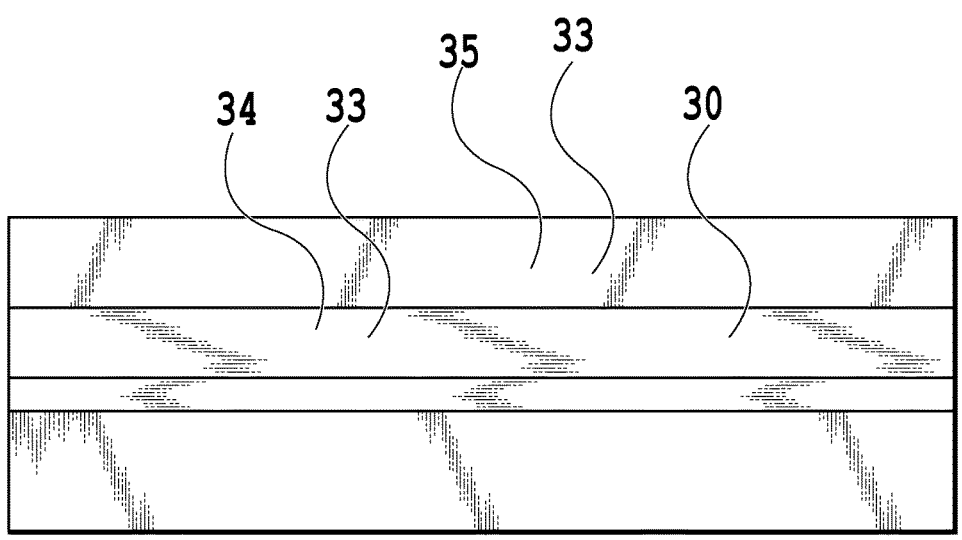
FIG. 13 is a left side view of the tool block of FIG. 10.

As described above, as shown in FIGS. 10 and 11, the tool block 30 of the cutting tool 1 of the present embodiment has the attachment reference surface 31. On the attachment reference surface 31, a longitudinal direction is defined. One end surface of the tool block 30 as viewed from the longitudinal direction is defined as the front. With a front direction of the plate member 2, the direction of FIG. 11 is defined as the front. The portion around the attachment reference surface 31 may also be called a shank portion. The attachment reference surface 31 is pressed against an edge stand of a machine tool such as a turning machine and the tool block 30 is mounted on the machine tool. That is, the tool block 30 is a member for holding the plate member 2 and mounting the plate member 2 on the machine tool.

The tool block 30 of the present embodiment has a vertical wall surface 31a near the attachment reference surface 31 formed on the side of the bottom surface. The vertical wall surface 31a may also serve as a reference surface in a width direction when mounted on the machine tool. It should be noted that the shape of the attachment reference surface 31 of the tool block 30 and the shape of the reference surface in a width direction are appropriately selected according to an edge stand, a holder, an adapter, and the like of the machine tool.

The tool block 30 has a bottom restraining surface 32 which comes into contact with the bottom surface 4 of the plate member 2. The bottom restraining surface 32 has a shape adapted to the inclined portion of the bottom surface 4 of the plate member 2. That is, the bottom restraining surface 32 is inclined with respect to the attachment reference surface 31 in a direction of gradually rising as a distance from the attachment reference surface 31 increases in a direction parallel to the attachment reference surface 31. In the present embodiment, the bottom surface 4 of the plate member 2 is configured to be flat, and accordingly the bottom restraining surface 32 of the tool block 30 is also configured to be flat, but not limited thereto. The bottom restraining surface 32 may be any surface as long as it can come into contact with the inclined portion of the bottom surface 4. An angle of inclination B shown in the front view of FIG. 11 with respect to the attachment reference surface 31 of the bottom restraining surface 32 is preferably in the range of 90° to 170°. The angle of inclination B is more preferably in the range of 100° to 130°. Such an angle of inclination B can generate a restraining force toward the first side surface 7 when the bottom restraining surface 32 comes into contact with the bottom surface 4 of the plate member 2, and can increase stability of fastening the plate member 2 to the tool block 30. In the present embodiment, the angle of inclination B of the bottom restraining surface 32 with respect to the attachment reference surface 31 is set to about 115°.

The tool block 30 has a side restraining surface 33 which comes into contact with the first side surface 7 of the plate member 2. In the present embodiment, the side restraining surface 33 has a two-step structure. That is, the side restraining surface 33 has a first contact portion 34 and a second contact portion 35. Since the first side surface 7 of the plate member 2 is a curved surface, if the shape of the side restraining surface 33 is completely identical with the curved shape of the first side surface 7, the tool block 30 cannot be shared among plate members 2 having first side surfaces 7 with various radii of curvature. In addition, it is sometimes difficult to produce the tool block 30 to have the side restraining surface 33 having a shape that is completely identical with the curved shape of the first side surface 7. Accordingly, in the present embodiment, the side restraining surface 33 is configured to have the two-step structure, which actively provides two contact points as viewed from the front, so that the tool block 30 is applicable to the plate members 2 having first side surfaces 7 with various radii of curvature. Also, the plate member 2 is configured to be fastened to the tool block 30 in a stable manner. That is, since the side restraining surface 33 has the first contact portion 34 and the second contact portion 35, the side restraining surface 33 comes into contact with the first side surface 7 of the plate member 2 in two points. In addition, since the bottom surface 4 and the bottom restraining surface 32 contact each other, the position of the plate member 2 in three contact points becomes stable. Accordingly, variations in the radius of curvature of the first side surface 7 of the plate member 2 can be absorbed in some degree. Further, the plate member 2 can be fastened in a very stable manner.

Figure 14:
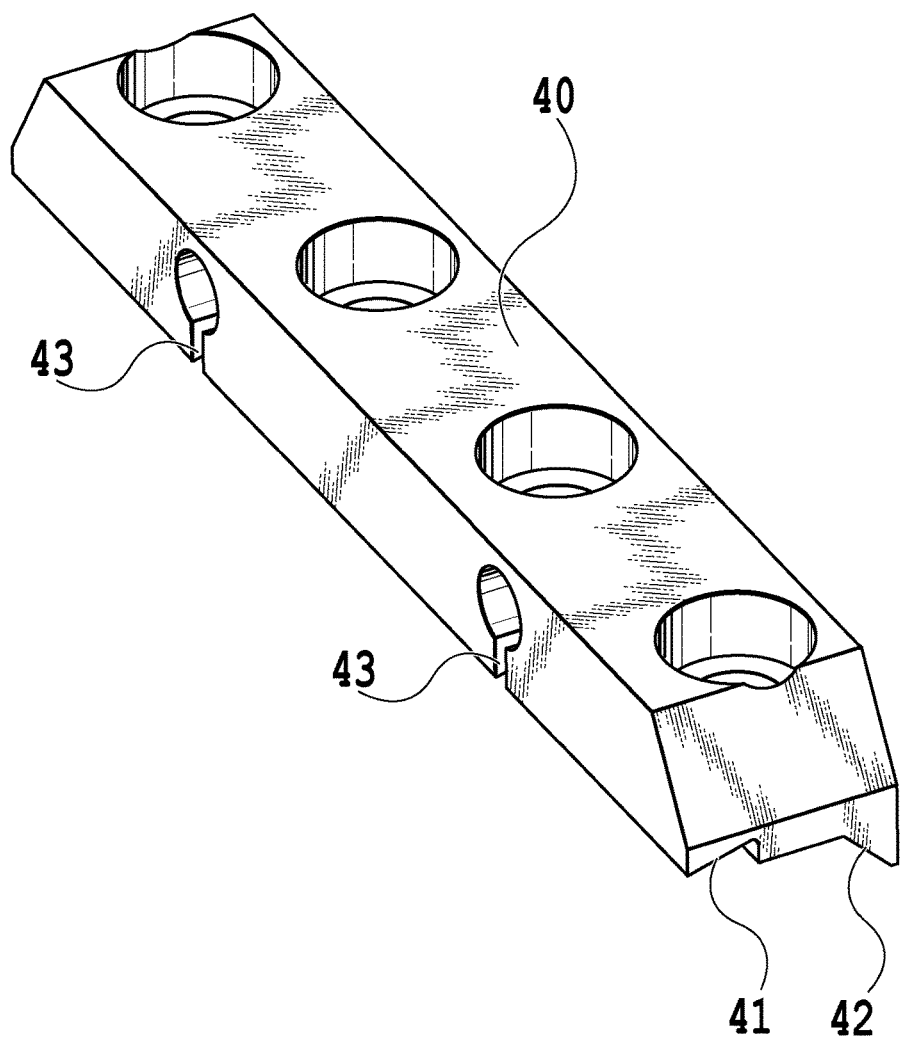
FIG. 14 is a perspective view of a clamp member of the cutting tool of FIG. 1.

The tool block 30 has a guiding surface 36 which comes into contact with the clamp member 40 on the top surface opposite to the attachment reference surface 31. As shown in FIGS. 14 and 15, the clamp member 40 has a top restraining surface 41 which comes into contact with the top surface 3 of the plate member 2 and a guided surface 42 which comes into contact with the guiding surface 36 of the tool block 30. The clamp member 40 is fastened to the tool block 30 by the fastening member 50 such as a fastening bolt. Tightening the fastening member 50 allows the clamp member 40 to fasten the plate member 2 to the tool block 30. That is, the tool block 30 has a fastening means corresponding to the fastening member 50. That is, if the fastening member 50 is a fastening bolt, the tool block 30 has a threaded hole with an internal thread corresponding to an external thread of the fastening bolt. In the cutting tool 1 of the present embodiment, as described before, the position of the plate member 2 is stable in three contact points. Therefore, pressing the top surface 3 of the plate member 2 by the top restraining surface 41 of the clamp member 40 can completely fasten the plate member 2 to the tool block 30. It should be noted that in the present embodiment, the fastening member 50 includes four fastening bolts, but not limited thereto. The fastening member 50 may be one fastening bolt. Alternatively, two, three, or five or more fastening bolts may also be used. Needless to say, a fastening method other than a bolt may be used.

The guiding surface 36 of the tool block 30 is inclined in the same direction as the inclination direction of the bottom restraining surface 32. Therefore, the guiding surface 36 is inclined in a direction opposite to the inclination direction of the top surface 3 of the plate member 2. That is, the guiding surface 36 generates a force which draws the clamp member 40 to the side of the first side surface 7 of the plate member 2. Accordingly, the top restraining surface 41 of the clamp member 40, when coming into contact with the top surface 3 of the plate member 2, generates a force which presses the first side surface 7 of the plate member 2 against the side restraining surface 33. A synergistic effect of these structures allows the plate member 2 to be very firmly fastened to the tool block 30. As a result, the clamping rigidity increases and occurrence of chatter vibration can be greatly suppressed. Furthermore, the quality of a finished surface of a workpiece can be greatly improved.

As shown in FIGS. 14 and 15, the clamp member 40 of the present embodiment has two slits 43 in a direction crossing the longitudinal direction. The slits 43 are provided to promote elastic deformation of the clamp member 40. That is, providing the slits 43 allows the clamp member 40 to easily elastically deform, and come into close contact with the plate member 2 and the tool block 30 in a larger area. Therefore, the clamping becomes more stable. But the configuration of the clamp member 40 is not limited to this. One or three or more slits may be provided. Alternatively, depending on the material or the like of the clamp member 40, no slit may be provided.

Second Embodiment

Figure 18:
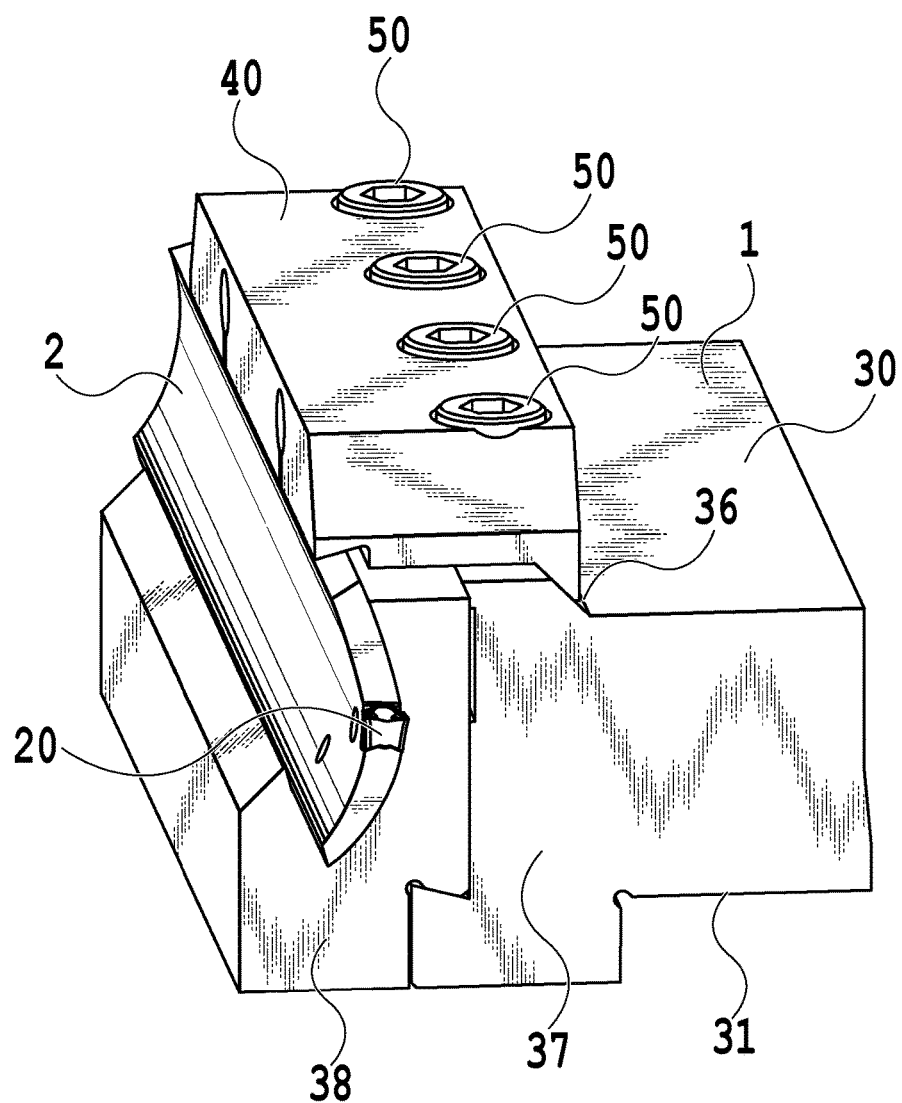
FIG. 18 is a perspective view of a cutting tool according to a second embodiment.

FIG. 18 shows a cutting tool 1 of a second embodiment. It should be noted that parts similar to the parts of the first embodiment are indicated by the same reference numerals and a description thereof will be omitted. A tool block 30 of the cutting tool 1 of the present embodiment is a combined structure in which a plurality of members are combined. That is, the tool block 30 includes a first tool block member 37 and a second tool block member 38. The shape of the combined structure including the first and second tool block members 37, 38 is the same as that of the tool block 30 of the first embodiment. The first tool block member 37 and the second tool block member 38 are fastened by a fastening bolt or the like.

The first tool block member 37 and the second tool block member 38 may have a plurality of contact surfaces having complementary shapes on which they come into contact with each other to stably hold their positional relation. The plurality of contact surfaces may be arranged to have a portion defining an acute angle. In the tool block 30 of the present embodiment, a guiding surface 36 and an attachment reference surface 31 are formed on the first tool block member 37. Further, a bottom restraining surface 32 and a side restraining surface 33 are formed on the second tool block member 38. That is, a member having the guiding surface 36 formed thereon is different from a member on which the bottom restraining surface 32 and the side restraining surface 33 are formed. If the tool block 30 is configured to be a combined structure, it is sufficient to change only the second tool block member 38 when plate members 2 having first side surfaces 7 with various curved shapes and various radii of curvature are replaced so as to be applied to grooving into various diameters. Therefore, it is possible to provide the tool block 30 with high precision adapted to the curved shape of the plate member 2. Also, a production cost of members to be replaced decreases, which is economical. Also, a storage space for replacement parts is saved, which facilitates storage management (stock control).

Third Embodiment

Figure 19:
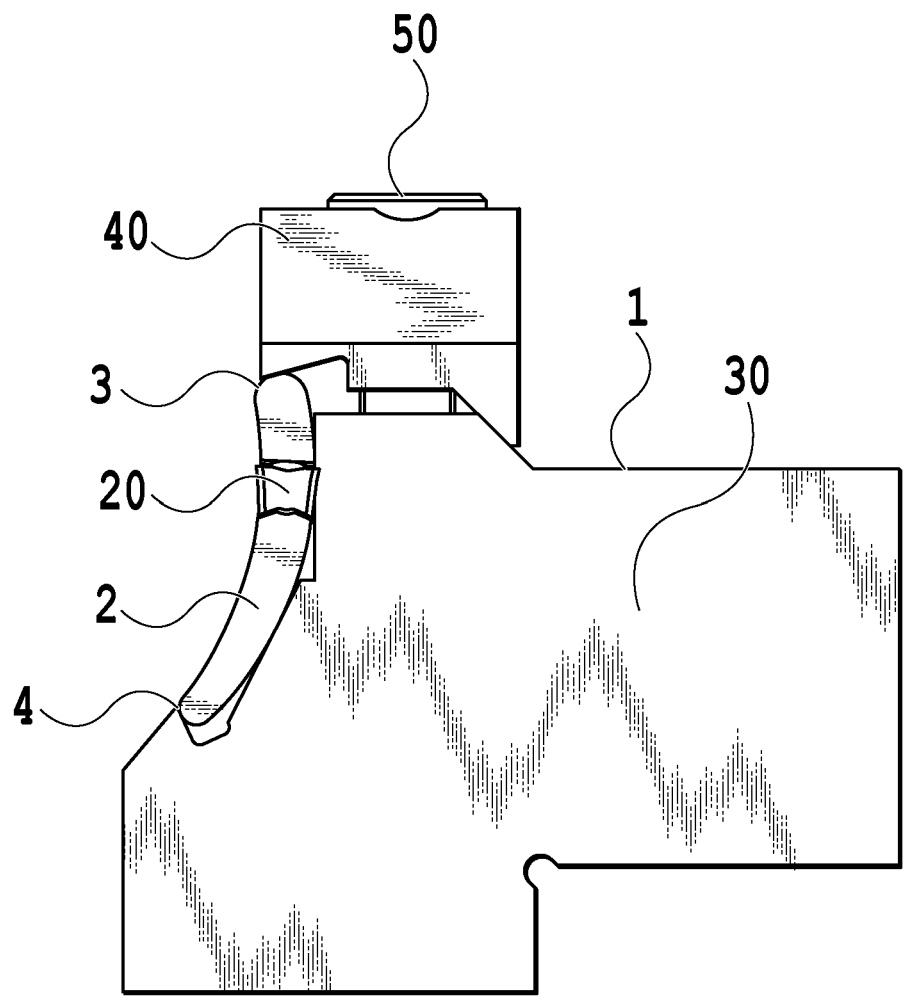
FIG. 19 is a front view of a cutting tool according to a third embodiment.

FIG. 19 shows a cutting tool 1 of a third embodiment. It should be noted that parts similar to the parts of the first embodiment are indicated by the same reference numerals and a description thereof will be omitted. A plate member 2 of the cutting tool 1 of the third embodiment has a top surface 3 and a bottom surface 4 that are curved surfaces. In this manner, the shape of the top surface 3 and the shape of the bottom surface 4 are not limited to flat surfaces. It is only need to incline a substantial contact surface of the bottom surface 4 and a substantial contact surface of the top surface 3 with respect to each other. The plate member 2 of the present embodiment has the top surface 3 and the bottom surface 4 that are both cylindrical surfaces. That is, as viewed from the front, both the profile of the top surface 3 and the profile of the bottom surface 4 are arcs. In other words, in the cross-sectional shape as viewed from the front, both the top surface 3 and the bottom surface 4 are arcs. If the profile is an arc, an inclination direction of the top surface 3 or the bottom surface 4 may be defined as a tangential direction in the midpoint of the arc. In the plate member 2 of the present embodiment, a tangential direction in the midpoint of the arc of the bottom surface 4 is inclined with respect to a tangential direction in the midpoint of the arc of the top surface 3. The top surface 3 and the bottom surface 4 that are curved surfaces are not limited to the cylindrical surfaces. For example, serrations or the like may be formed so that the top surface 3 and the bottom surface 4 have more complicated curved surfaces.
(Others)

The plate member of the cutting tool, the tool block, and the clamp member of the present invention are not limited to the above-described embodiments and modification examples. Various changes and additions that do not depart from the gist of the present invention may be made.

For example, the plate member 2 and the tool block 30 may be coupled also by, for example, providing a protrusion on one of the plate member 2 and the tool block 30 and providing complementary recesses on the other, so that the projection length of the plate member 2 may be adjusted in stages. Further, marks such as scale marks may be provided on one of the plate member 2 and the tool block 30, and an indication mark may be provided on the other, so that the projection length may be visually checked. Various other conventional techniques may be applied to adjust the projection length of the cutting tool.

A cutting edge of a cutting insert 20, a cutting edge of a plate member to which an insert having the cutting edge is brazed or a cutting edge of a plate member integrally formed with the cutting edge, and tool material around the cutting edge are preferably selected from hard material such as cemented carbide, cermet, ceramic, cubic boron nitride, or the hard material having a surface coated with a PVD or CVD coating film, and diamond.

The plate member of the cutting tool may be applied to various cutting tools, and can be used for cutting machining of steel or the like by mounting the cutting tool on a machine tool. In particular, the plate member of the cutting tool is effective when applied to a cutting tool for turning machine or a rotary cutting tool for face grooving of a workpiece. The embodiments have described only a cutting tool for face grooving for a turning machine, but the present invention may be applied to a rotary cutting tool or the like called a trepanning tool. The trepanning tool is a rotary cutting tool for grooving or boring.

Furthermore, in the above-described embodiments, the insert seat 13 is provided on the side of the top surface 3 of one end surface 5 of the plate member 2 which is substantially a rectangle as viewed from the side (for example, as viewed from a direction facing the first side surface 7). However, an insert seat may be provided on the other end surface 6. For example, an insert seat may be provided on a corner portion defined between the rear end surface 6 and the top surface 3 of the plate member. In this case, if the plate member with a cutting insert attached to the insert seat is used, the plate member is fastened by a clamp member 40 and a fastening member 50 that are reversed as compared to those of FIG. 1, so as to constitute a cutting tool 1. Also in this case, as described in the first embodiment, the plate member may be one to which an insert having a cutting edge is brazed or one integrally formed with a cutting edge.

In addition, in the above-described embodiments, both the first and second side surfaces 7 and 8 are curved surfaces. However, only the first side surface 7 may be a curved surface as described above. That is, as long as a contact between the top restraining surface 41 of the clamp member 40 and the top surface 3 of the plate member 2 effectively applies a force which presses the first side surface 7 of the plate member 2 against the side restraining surface 33, or as long as the second side surface 8 does not interfere with a wall surface, near the center O, of the annular groove machined on the workpiece, the second side surface may not be a curved surface as described above.

The invention claimed is:
1. A cutting tool assembly, comprising:
a tool block comprising a bottom restraining surface; and
a plate member of a cutting tool seated in the tool block;
wherein:
the plate member comprises:

first and second side surfaces being substantially rectangular in shape in a side view of plate member, each side surface having long and short sides;
a top surface and a bottom surface extending in a longitudinal direction along the long side, and
two end surfaces along a direction of the short side, wherein:
a cutting edge is located on the side of at least one end surface of the two end surfaces,
the first side surface is a convexly curved surface bulging outward between the top surface and the bottom surface, and
the bottom surface has an inclined portion which is inclined with respect to the top surface,
the bottom surface of the plate member is in contact with the bottom restraining surface of the tool block,
the tool block comprises a side restraining surface;
the first side surface of the plate member is in contact with the side restraining surface, and
the side restraining surface has at least two contact portions which come into contact with the first side surface.

2. The cutting tool assembly according to claim 1, wherein:
the tool block further comprises an attachment reference surface; and
the bottom restraining surface is inclined with respect to the attachment reference surface.

3. The cutting tool assembly according to claim 2, wherein:
on the attachment reference surface, a longitudinal direction is defined, and
as viewed from a front side perpendicular to the longitudinal direction, an inclination direction of the bottom restraining surface is a direction of gradually rising as a distance from the attachment reference surface increases in a direction parallel to the attachment reference surface.

4. The cutting tool assembly according to claim 3, wherein:
as viewed from the front side, an angle of inclination (B) with respect to the attachment reference surface of the bottom restraining surface is in the range of 90° to 170°.

5. The cutting tool assembly according to claim 1, wherein:
the tool block comprises a guiding surface; and
the guiding surface comes into contact with a clamp member.

6. The cutting tool assembly according to claim 5, wherein:
the bottom restraining surface is inclined with respect to an attachment reference surface of the tool block;
on the attachment reference surface, a longitudinal direction is defined, and
as viewed from a front side perpendicular to the longitudinal direction, the guiding surface is inclined with respect to the attachment reference surface of the tool block, and
wherein an inclination direction of the guiding surface is identical to an inclination direction of the bottom restraining surface.

7. The cutting tool assembly according to claim 5, wherein:
the tool block is a combined structure in which a plurality of members are combined, and
a member forming the guiding surface is different from a member forming the bottom restraining surface.

8. A cutting tool comprising:
a tool block comprising;
a side restraining surface comprising a first planar contact portion and a second planar contact portion, the first planar contact portion forming an obtuse angle with respect to the second planar portion;
a bottom restraining surface facing in a direction of the side restraining surface; and
an attachment reference surface for mounting the tool block onto a machine tool; wherein:
the first planar contact portion is located between the second planar contact portion and the bottom restraining surface, in a front view of the tool block; and
a plate member retained in the tool block, the plate member having a substantially rectangular shape in a side view thereof and comprising;
long top and bottom surfaces extending along a longitudinal direction of the plate member;
two short end surfaces extending in a direction transverse to the longitudinal direction and connecting the top and bottom surfaces;
a substantially rectangular first side surface which is convexly curved between the top and bottom surfaces;
a substantially rectangular second side surface which is concavely curved between the top and bottom surfaces, and the second side surface facing in a direction opposite to that of the first side surface;
a cutting edge located proximate an intersection of the top surface and one of the two short end surfaces; wherein:
the bottom surface has an inclined portion which is inclined with respect to the top surface; and
a clamp member comprising a top restraining surface; wherein:
the tool block's bottom restraining surface is in abutment with plate member's bottom surface;
the tool block's first and second planar contact portions are in abutment with two vertically spaced apart portions of the convexly curved first side surface, in said front view of the tool block; and
the clamp member's top restraining surface is in abutment with the plate member's top surface, to thereby fasten the plate member to the tool block.

9. The cutting tool according to claim 8, wherein:
a cross-sectional shape of the plate member is constant along a predetermined range of a length of the rectangular shape, such that the plate member is capable of being retained in the tool block over a corresponding range of projection lengths, along the longitudinal direction.

10. The cutting tool according to claim 8, wherein:
the inclined portion of the plate member's bottom surface is inclined with respect to the plate member's top surface at an angle of inclination (A) of between 10° and 90°; and
the tool block's attachment reference surface forms an angle (B) of between 100° and 130° with the tool block's bottom restraining surface.

11. A tool block for a plate member of a cutting tool, the plate member seated in the tool block, the plate member comprising a bottom surface and a side surface, the tool block comprising:

a side restraining surface comprising a first planar contact portion and a second planar contact portion, the first planar contact portion forming an obtuse angle with respect to the second planar portion;

a bottom restraining surface facing in a direction of the side restraining surface; and an attachment reference surface for mounting the tool block onto a machine tool; wherein:

the first planar contact portion is located between the second planar contact portion and the bottom restraining surface, in a front view of the tool block, the bottom surface of the plate member is in contact with the bottom restraining surface of the tool block, the side surface of the plate member is in contact with the side restraining surface, and the first planar contact portion and the second planar contact portion of the side restraining surface come into contact with the side surface of the plate member.

12. The tool block according to claim 11, wherein:

the tool block's attachment reference surface forms an angle (B) of between 90° and 170° with the tool block's bottom restraining surface.

* * * * *